(12) United States Patent
Stevens (10) Patent No.: US 8,048,296 B2
(45) Date of Patent: Nov. 1, 2011

(54) FILTERING DEVICE FOR LIQUID FILTRATION

(75) Inventor: Jay Stevens, Conroe, TX (US)

(73) Assignee: Jay Stevens, Conroe, TX (US)

( * ) Notice: Subject to any disclaimer, the term of this patent is extended or adjusted under 35 U.S.C. 154(b) by 479 days.

(21) Appl. No.: 11/873,701

(22) Filed: Oct. 17, 2007

(65) Prior Publication Data

US 2009/0178976 A1  Jul. 16, 2009

Related U.S. Application Data

(60) Provisional application No. 60/862,401, filed on Oct. 20, 2006.

(51) Int. Cl.
| | |
|---|---|
| *B01D 29/00* | (2006.01) |
| *B01D 29/39* | (2006.01) |
| *B01D 29/68* | (2006.01) |
| *B01D 35/00* | (2006.01) |
| *B01D 35/12* | (2006.01) |
| *B01D 35/16* | (2006.01) |
| *B01D 35/30* | (2006.01) |

(52) U.S. Cl. ........... 210/107; 210/90; 210/106; 210/108; 210/109; 210/327; 210/331; 210/334; 210/345; 210/346; 210/347; 210/413; 210/414; 210/416.1

(58) Field of Classification Search ................. 210/106, 210/107, 334, 357, 461, 90, 108, 109, 327, 210/345, 346, 331, 347, 413, 414, 416.1, 210/741, 791
See application file for complete search history.

(56) References Cited

U.S. PATENT DOCUMENTS

| | | | | |
|---|---|---|---|---|
| 3,857,786 | A * | 12/1974 | Wolf, Jr. ...................... | 210/331 |
| 5,275,728 | A * | 1/1994 | Koller ......................... | 210/391 |
| 6,103,132 | A * | 8/2000 | Seyfried et al. .............. | 210/791 |
| 2005/0000870 | A1* | 1/2005 | Ricketts ....................... | 210/107 |
| 2005/0139557 | A1* | 6/2005 | Ricketts ....................... | 210/791 |

* cited by examiner

Primary Examiner — Nam Nguyen
Assistant Examiner — Paul J. Durand
(74) Attorney, Agent, or Firm — King & Spalding LLP (57) ABSTRACT

An apparatus for filtering liquid that includes a filter having an external surface; a rotatable shaft extending through the filter; and a movable member coupled to the rotatable shaft. The movable member is configured to impart a suction force at various locations across the external surface of the filter. The movable member has a trailing portion that extends further than the leading portion in the direction toward the filter.

16 Claims, 6 Drawing Sheets

FILTERING DEVICE FOR LIQUID FILTRATION

CROSS REFERENCE TO RELATED APPLICATIONS

This application claims the benefit of the filing date of U.S. Provisional Patent Application Ser. No. 60/862,401, filed on Oct. 20, 2006, the disclosure of which is incorporated herein by reference in its entirety.

BACKGROUND

The present disclosure relates in general to water filtration devices and in particular to water filtration devices for use in municipal and/or industrial applications. Applications include, for example, tertiary filtration, water reuse, process streams and/or surface water treatment applications.

DETAILED DESCRIPTION

Figure 1:
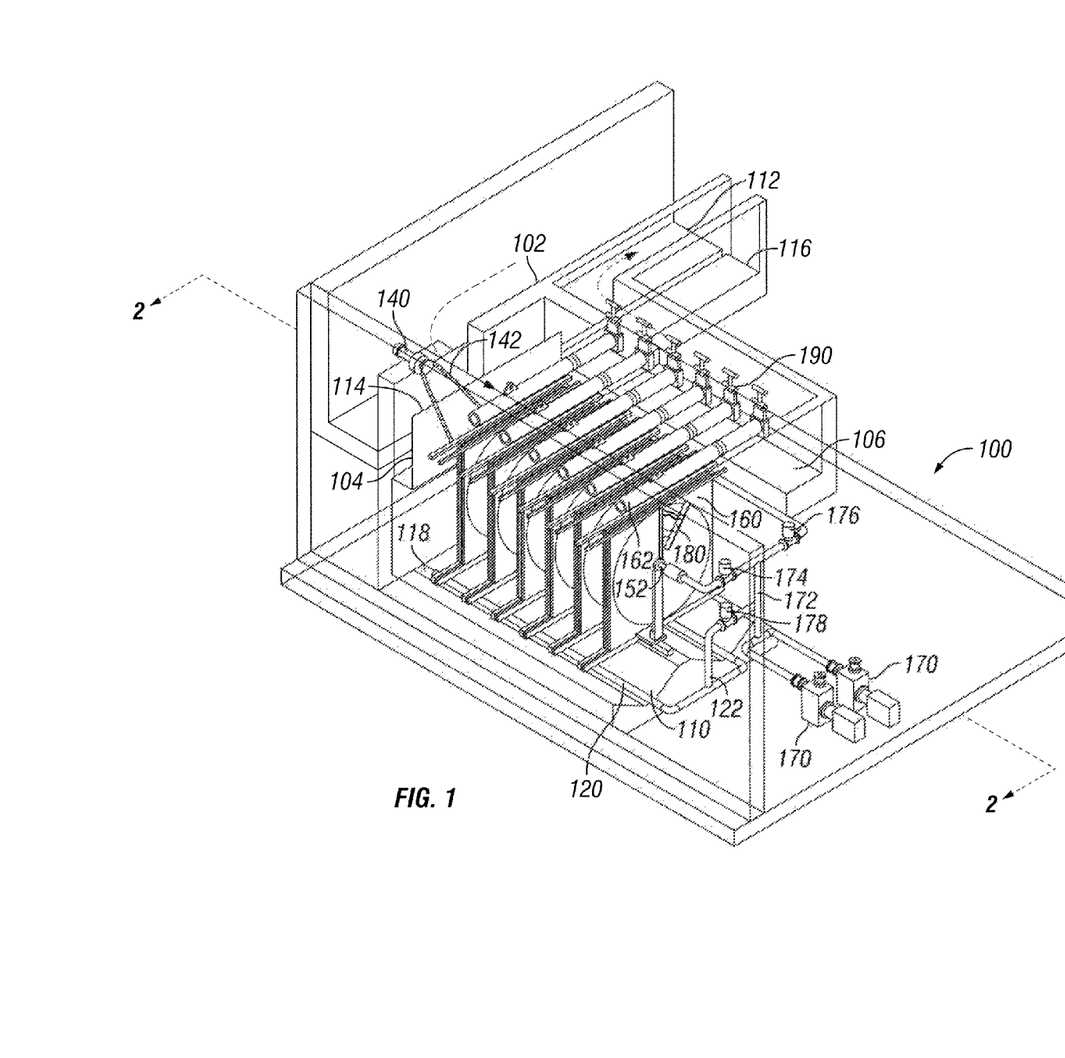
FIG. 1 is a perspective view of an embodiment of a filtration device, with a tank depicted as transparent for clarity purposes only so that the internal components of the device are depicted.
Figure 2:
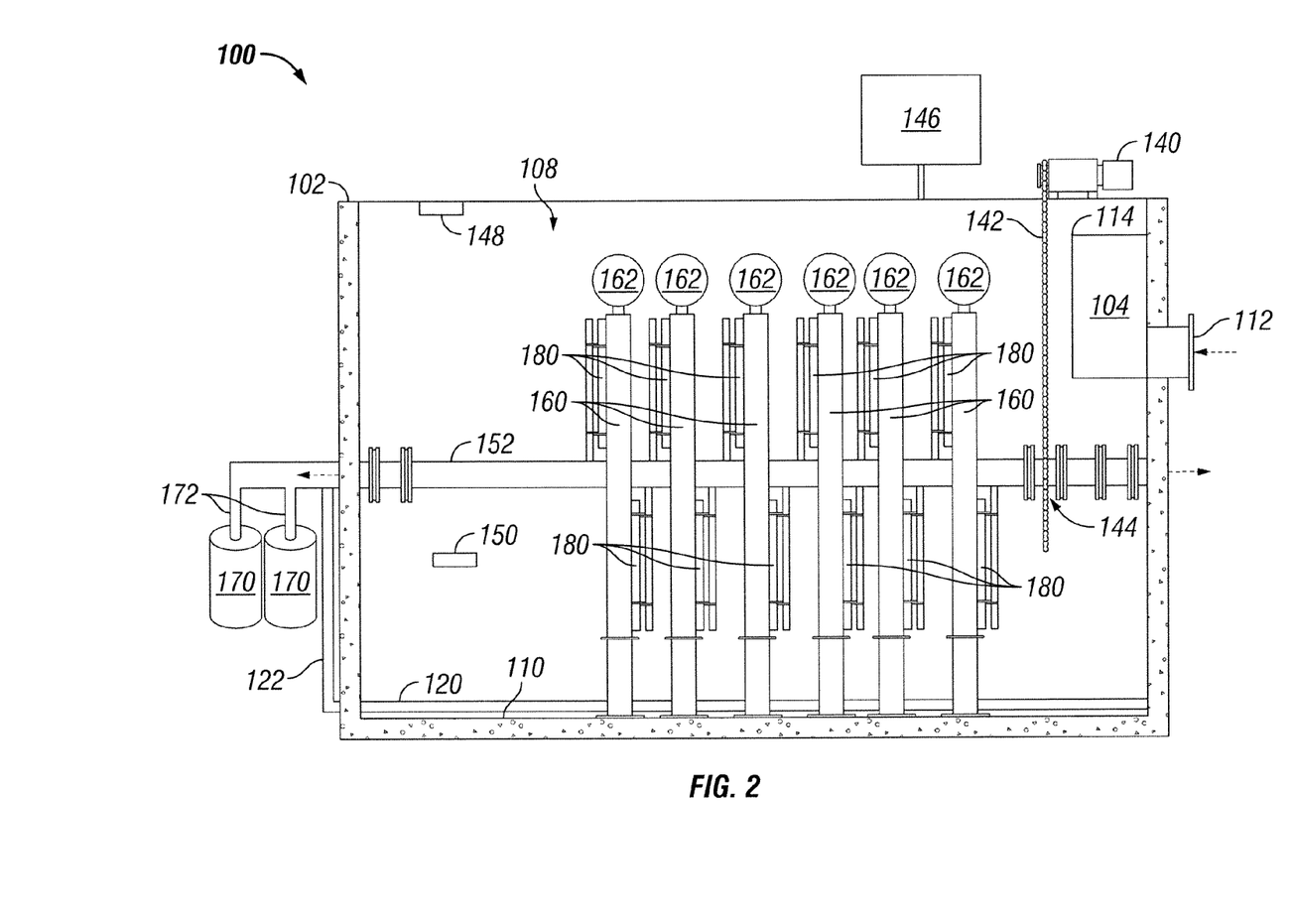
FIG. 2 is a schematic view of the device of FIG. 1 taken along line 2-2.

In an exemplary embodiment, as illustrated in FIGS. 1 and 2, a water filtration system is generally referred to by the reference numeral 100 and includes a tank 102. In an exemplary embodiment, the tank 102 is composed of steel, stainless steel and/or concrete. The tank 102 is shaped so that the tank 102 includes an influent trough 104, an effluent trough 106, a filtration chamber 108, and an underdrain 110.

The influent trough 104 comprises an influent trough entrance 112 that is open to the outside environment, an influent trough exit 114 that is open to the filtration chamber 108. The effluent trough 106 has an effluent trough exit 116 that is open to the outside environment.

The underdrain 110 is located at the bottom of the filtration chamber 108. In an exemplary embodiment, the underdrain 110 comprises two valleys with four-inch flat bottoms 118. The flat bottoms can be of various length and widths, and the valleys can be sloped at various angles. Internal sludge withdrawal piping 120 rests within the flat bottoms 118 of the valleys and extends along the entire length of the underdrain 110. External sludge withdrawal piping 122 is located external to the tank 102 and connects to the internal sludge withdrawal piping 120 through the tank 102.

A drive unit 140 is attached to the top of the tank 102. One end of a chain 142 is coupled to the drive unit 140. The other end of the chain 142 is coupled to a sprocket 144.

A control system 146 is located somewhere near the tank 102. It is also possible to locate the control system 146 at a remote location. A top level-sensing probe 148 is mounted at the top of the tank 102, and is operably coupled to the control system 146. The bottom level-sensing probe 150 is mounted within the filtration chamber 108 beneath the top level-sensing probe 148 and is also operably coupled to the control system. In an exemplary embodiment, the top level-sensing probe 148 and bottom level-sensing probe 150 comprise ultrasonic non-contact sensing probes. Other types of sensing probes are possible.

A rotating shaft 152 is coupled to the center of the sprocket 144. The rotating shaft 152 extends from the sprocket 144 to the end of the filtration chamber 108 opposite the sprocket 144.

A plurality of hollow disc-shaped filters 160 are situated within the filtration chamber 108. The filters can be of various shapes, including for example, a substantially drum-shaped filter. In the center of each disc-shaped filter 160, there is a circle with a circumference that is larger than the circumference of the rotating shaft 152. The rotating shaft 152 passes through the center circle of each of the disc-shaped filters 160. A filtrate pipe 162 is located above, and coupled to, each of the disc-shaped filters 160. The filtrate pipes 162 extend from the effluent trough 106 to their specific locations above the disc-shaped filters 160. Each filtrate pipe 162 is connected to the effluent trough 106 with a watertight valve 190. Each filtrate pipe 162 is permanently welded to the top of its respective disc-shaped filters 160.

One or more backwash pumps 170 are located external to the tank 102. External backwash piping 172 is located on the outside of the tank 102. The external backwash piping 172 connects the backwash pumps 170 to the rotating shaft 152. External sludge withdrawal piping 122 connects the internal sludge withdrawal piping 120 to the backwash pumps 170. As illustrated in FIGS. 1 and 2, valve 174, valve 176, and valve 178 are situated along the external backwash piping 172. In an exemplary embodiment, valve 174, valve 176, and valve 178 are electrically actuated valves. The three disc-shaped filters 160 on the end opposite the drive unit 140 are associated with valve 176. The three disc-shaped filters 160 on the end nearest the drive unit 140 are associated with valve 174. Other configurations of disc-shaped filters 160 and valve 174 and valve 176 are possible.

A plurality of suction bars 180 are coupled to the rotating shaft 152, and situated on the exterior of each of the disc-shaped filters 160. In an exemplary embodiment, as illustrated in FIGS. 1 and 2, each disc-shaped filter 160 has one suction bar 180 on each side of each disc-shaped filter 160. In another exemplary embodiment, each suction bar 180 is the length of the radius of the disc-shaped filter 160, and extends from the rotating shaft 152 to the edge of the disc-shaped filter 160. In an exemplary embodiment, for each disc-shaped filter 160, one suction bar 180 is located on each side of the disc-shaped filter 160, and the suction bar 180 on one side of the disc-shaped filter 160 is placed 180 degrees apart from the suction bar 180 on the opposite side of the disc-shaped filter 160. It is possible to stagger the placement of the suction bars 180 on each disc-shaped filter 160. For example, in an exemplary embodiment, the suction bars 180 on the disc-shaped filter 160 closest to the drive unit 140 are placed at 0 degrees and 180 degrees with respect to the rotating shaft 152; then the suction bars 180 on the disc-shaped filter 160 next closest to the drive unit 140 are placed at 30 degrees and 210 degrees with respect to the rotating shaft 152; the suction bars 180 on subsequent disc-shaped filters 160 are staggered at 30 degree increments with respect to the suction bars 180 on the preceding disc-shaped filters 160.

Figure 3:
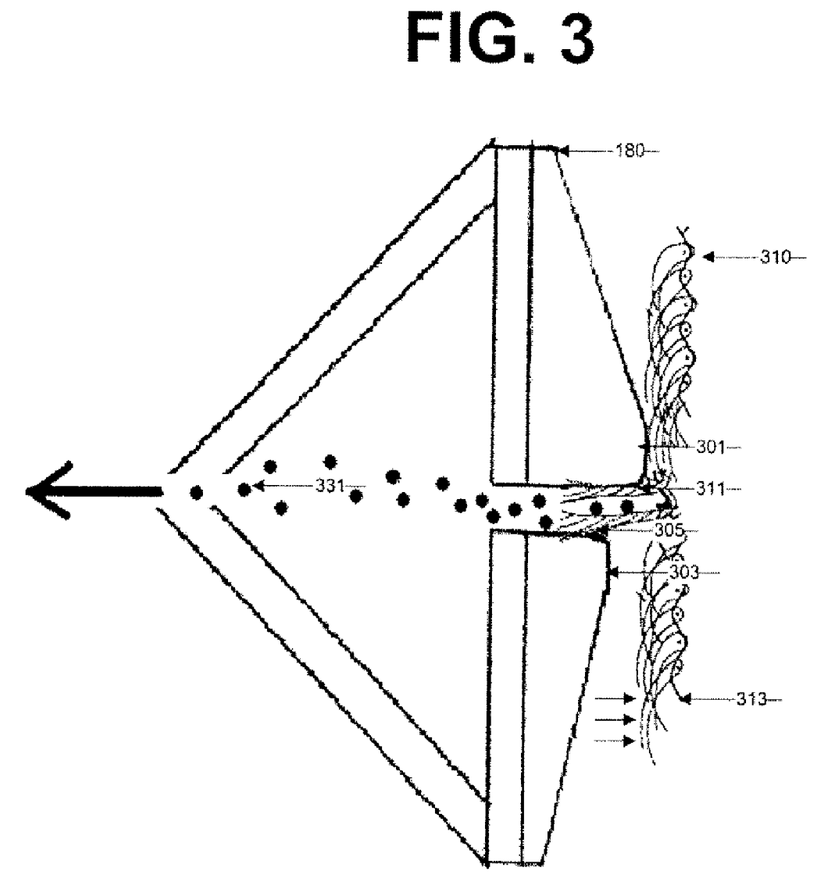
FIG. 3 is a sectional view of an embodiment of a suction bar of the device of FIG. 1.

In an exemplary embodiment, as illustrated in FIG. 3, each of the suction bars 180 comprises a trailing edge 301, a leading edge 303, and a vertical suction slit 305 located between the trailing edge 301 and the leading edge 303. A filter medium 310 covers the entire exterior of each of the disc-shaped filters 160. The filter medium 310 comprises a plurality of pile threads 311 woven into a supporting fabric 313. In an exemplary embodiment, the filter medium 310 is a high-quality layered pile fabric, and has effective 10 micron openings. Each suction bar 180 is situated on the exterior of the disc-shaped filter 160 at a distance such that the trailing edge 301 of the suction bar 180 contacts the pile threads 311 of the filter medium 310 when the pile threads 311 are flattened. However the leading edge 303 of the suction bar 180 does not contact pile threads 311 in their flattened state.

Figure 4:
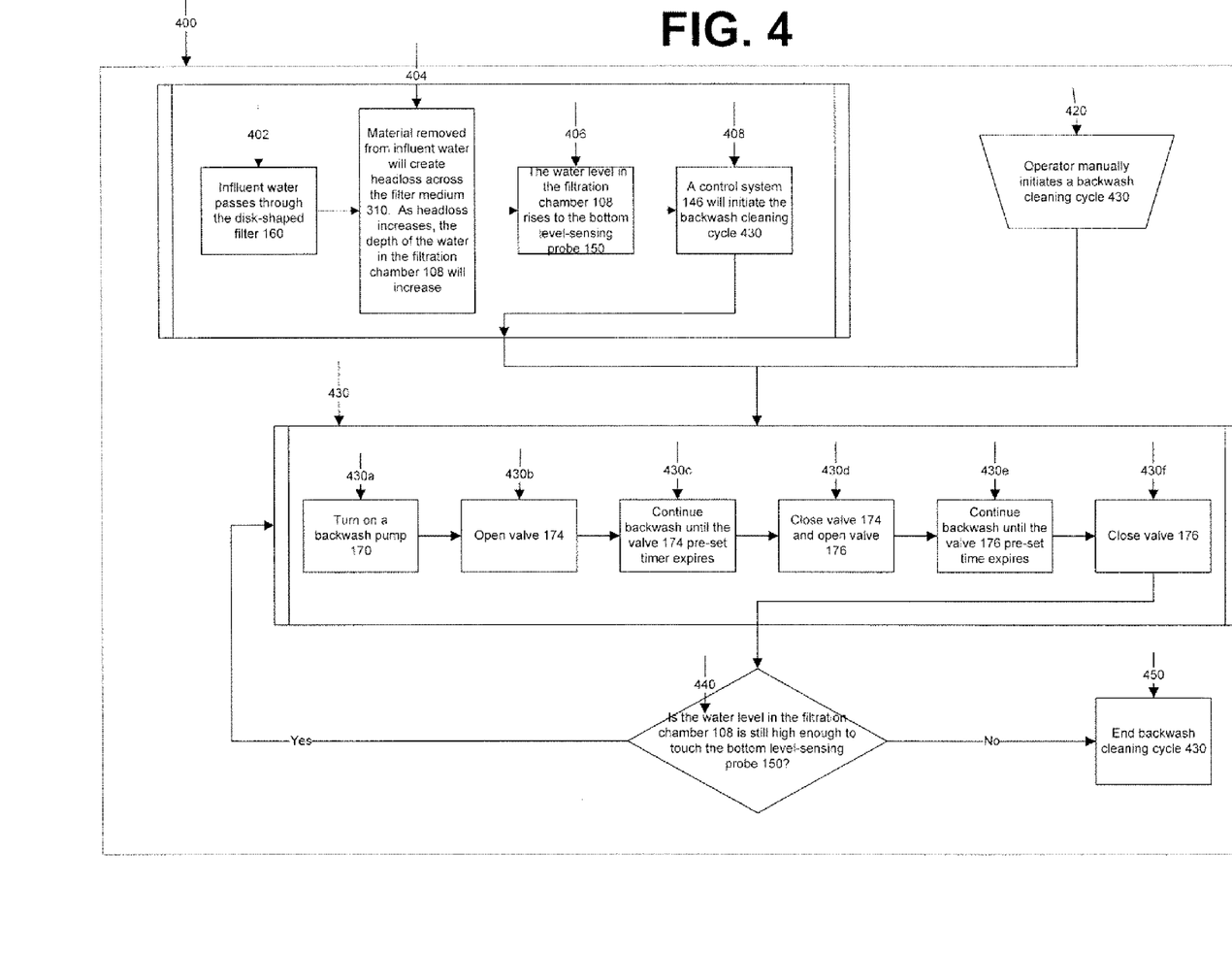
FIG. 4 is a flowchart illustrating the operation of the device of FIGS. 1 and 2.

In an exemplary embodiment as illustrated in FIG. 4 with continuous reference to FIGS. 1-3, a method of operating the water-filtration system is generally referred to by the reference numeral 400. In step 402, influent water enters the influent trough 104 through an influent trough entrance 112 and flows into the filtration chamber 108 through the influent trough exit 114. Within the filtration chamber 108, the influent water flows evenly across all of the disc-shaped filters 160 located in the filtration chamber 108. The water then passes through the filter medium 310 that encases each of the disc-shaped filters 160 and enters into the respective hollow interiors of the disc-shaped filters 160, thereby becoming filtrate. Said filtrate fills the interior of the disc-shaped filter 160 and rises to the top of the disc-shaped filter 160 towards the filtrate pipe 162; once the filtrate level inside the disc-shaped filter 160 reaches the filtrate pipe 162, the filtrate pipe 162 directs the flow of the filtrate to the effluent trough 106. The effluent trough 106 directs the flow of the filtrate out of the water filtration system 100.

In operation, each disc-shaped filter 160 has the capability of being totally isolated from the effluent trough 106 by means of a water tight isolation valve. This allows for one or more disc-shaped filters 160 to be removed from the filtration process without interrupting the filtration process 400. Removal of individual disc-shaped filters 160 is simple and can be done while the filter 100 remains in operation.

In step 404, solids 331 in the influent water create headloss across the filter medium 310. Headloss varies as a function of solids 331 loading and flow rate. In an exemplary embodiment, the available headloss is defined as the difference in water levels between the operating water level and the elevation of the bottom of the filtrate pipe 162. In an exemplary embodiment, the design headloss is a minimum 12" at the filtration chamber 108.

In an exemplary embodiment, headloss across the filter medium 310 is the governing factor in the operation of the disc filter system 100. As headloss increases, the depth of the water in the filtration chamber 108 will increase. The control system 146 sequences all pumps, motors, and valves during the backwash cleaning cycle 430. After the water level rises to the bottom level-sensing probe 150, in step 406, the control system 146 initiates a backwash cleaning cycle 430 in step 408. In an exemplary embodiment, instead of executing the steps 402, 404, 406 and 408, a backwash cleaning cycle 430 is manually initiated in step 420.

After the step 408 or 420 is executed, a backwash cleaning cycle 430 is executed in step 430. In step 430a, one of the two backwash pumps 170 turns on. In an exemplary embodiment, the control unit 146 alternates which backwash pump 170 is used for each backwash cleaning cycle 430.

In addition to turning on a backwash pump 170, the control unit 146 opens the valve 174 in step 430b. When the valve 174 is open, the backwash pump 170 provides suction for the disc-shaped filters 160 associated with valve 174. The backwash cleaning cycle 430 continues until the pre-set timer for valve 174 expires in step 430c, and then valve 174 closes and valve 176 opens in step 430d. When valve 176 is open, the backwash pump 170 provides suction for the disc-shaped filters 160 associated with the valve 176. The backwash cleaning cycle 430 continues until the pre-set timer for valve 176 expires in step 430e. After the pre-set timer for valve 176 expires, valve 176 closes in step 430f. Closure of valve 176 is the last step in the backwash cleaning cycle 430. In step 440, it is determined whether the water level is still high enough to touch the bottom level-sensing probe 150, and if so, then step 430 repeats. Otherwise, the backwash cleaning cycle 430 ends in step 450.

The backwash system operates by the motor drive unit 140 connected to the rotating shaft 152 by the chain 142 and the sprocket 144. The rotational speed of the rotating shaft 152 and suction bar 180 is designed for complete cleaning of the filter medium 310 during one backwash cleaning cycle 430. Solids 331 captured on the surface of the filter medium 310 are collected and removed from the surface of the filter medium 310 through the suction bar 180.

The suction for the suction bar 180 is generated by the backwash pumps 170. The reverse flow through the filter medium 310 allows complete and thorough cleaning of the cloth using filtered water from inside each disc-shaped filter 160. The openings in the filter medium 310 allow free flow of water during the backwash cleaning cycle. 430 The solids 331 captured on the surface of the filter medium 310 will have a free and clean release from the surface of the filter medium 310 when the suction bar 180 passes over the pile threads 311 of the filter medium 310 as the suction bar 180 rotates with the rotating shaft 152. As the surface of the suction bar 180 passes over the surface of the filter medium 310, there is minimal actual contact of the two surfaces, thereby reducing wear of the filter medium 310.

Before the pile threads 311 of the filter medium 310 reach the suction slit 305, the pile threads 311 are forced into a flattened position and prevented from straightening up by the flow of water. The pile threads 311 in their flattened state do not contact the leading edge 303 of the suction bar 180. As the pile threads 311 enter the suction slit 305 of the suction bar 180, the force of the reverse backwash suction generated by the backwash pumps 170 causes the pile threads 311 to gradually straighten within the suction slit 305. After the plurality of pile threads 311 enters the suction slit 305 and straightens within the suction slit 305, the trailing edge 301 of the suction bar 180 presses the pile threads back down towards the supporting fabric of the filter medium, thereby forming a seal between the flow of water, the suction bar 180, and the pile threads 311.

A blanket of sludge may form in the underdrain 110 over time. The angle of the valleys of the underdrain 110 causes sludge to move towards the flat bottoms 118 of the underdrain 110. The control system 146 can be set to withdraw sludge at a preset time of day, or an operator can manually initiate sludge withdrawal. When a sludge withdrawal sequence is initiated, a backwash pump 170 is turned on and valve 178 is opened. The backwash pump 170 runs for a preset length of time. During the sludge withdrawal sequence, the backwash pump 170 causes a reverse suction within the internal sludge withdrawal piping 120, and removes sludge from the flat bottoms 118 through the internal sludge withdrawal piping 120 and the external sludge withdrawal piping 122. When the preset length of time for the sludge withdrawal sequence expires, the backwash pump 170 is turned off and valve 178 is closed.

Figure 5:
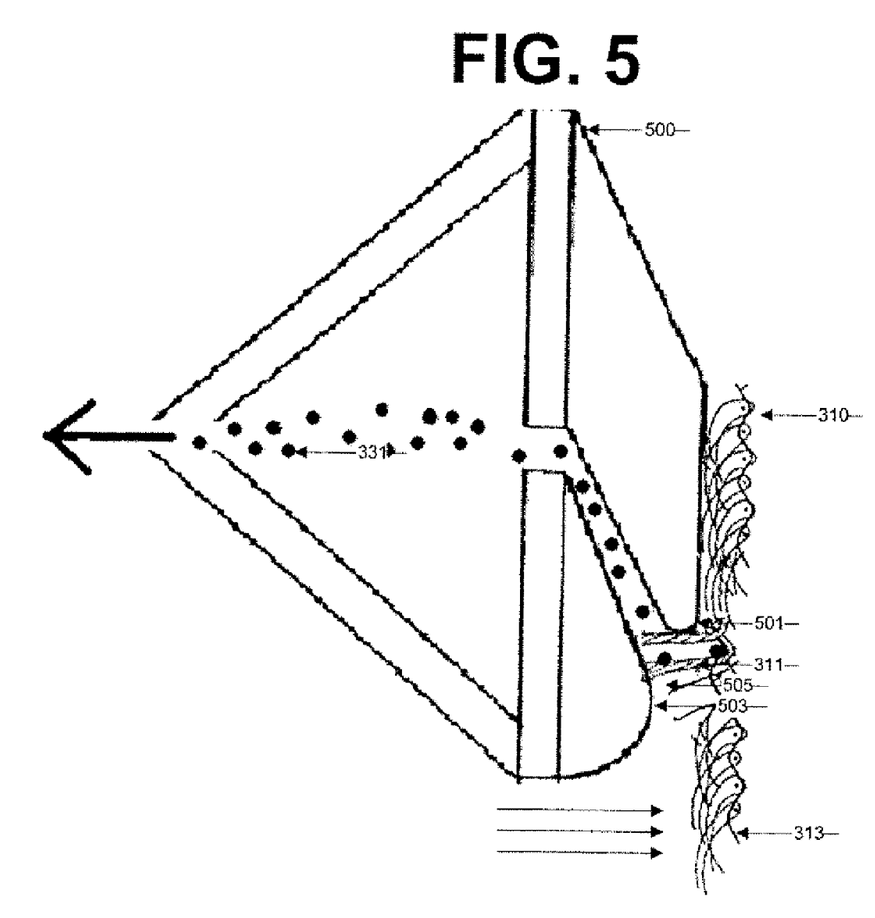
FIG. 5 is a sectional view of another embodiment of a suction bar of the device of in FIG. 1.

In an another embodiment, as illustrated in FIG. 5, another embodiment of the suction bar is generally referred to by the reference numeral 500, and contains the same parts of the suction bar 500 which are given the same reference numerals. In the embodiment of FIG. 5, the trailing edge 501 and the leading edge 503 of the suction bar 500 form an angular suction slit 505. The operation of this embodiment is similar to the operation of the previously described embodiment, suction bar 180, where the suction slit 305 was vertical. As in the previously described embodiment, each suction bar 500 is situated on the exterior of the disc-shaped filter 160 at a distance such that the trailing edge 501 of the suction bar 500 contacts the pile threads 311 of the filter medium 310 when the pile threads 311 are flattened. However the leading edge 503 of the suction bar 500 does not contact pile threads 311 in their flattened state. The currently described embodiment differs from the previously described embodiment, suction bar 180, in that the currently described embodiment allows for a more gradual straightening of the pile threads 311, because of the angle of the suction slit 505.

Figure 6:
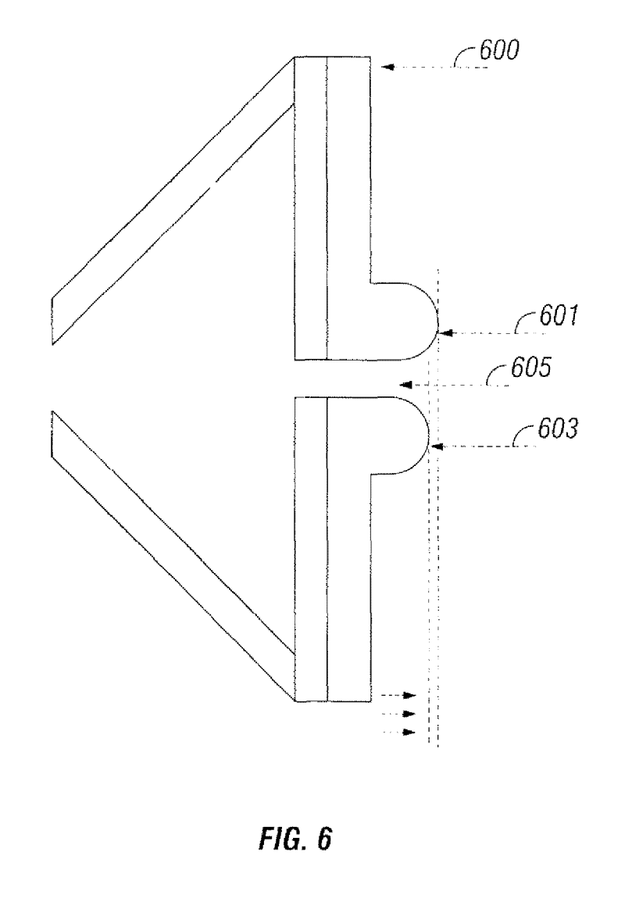
FIG. 6 is a sectional view of another embodiment of a suction bar of the device of in FIG. 1.

In an another embodiment, as illustrated in FIG. 6, another embodiment of the suction bar is generally referred to by the reference numeral 600, and contains the same parts of the suction bar 600 which are given the same reference numerals. In the embodiment of FIG. 6, the trailing edge 601 and the leading edge 603 of the suction bar 600 are rounded. The operation of this embodiment is similar to the operation of the previously described embodiment where the suction slit 605 was vertical. As in the previously described embodiment, each suction bar 600 is situated on the exterior of the disc-shaped filter 160 at a distance such that the trailing edge 601 of the suction bar 600 contacts the pile threads 311 of the filter medium 310 when the pile threads 311 are flattened. However the leading edge 603 of the suction bar 600 does not contact pile threads 311 in their flattened state. The currently described embodiment differs from the previously described embodiments in that less of the surface area of the trailing edge 601 contacts the pile threads 311. The leading edge 603 has a substantially planar leading edge and a substantially hemispherical trailing edge, and the trailing edge 601 has a substantially hemispherical leading edge and a substantially planar trailing edge. The substantially planar leading edges are parallel to the external surface of the exterior of the disc-shaped filter 160.

Figure 7:
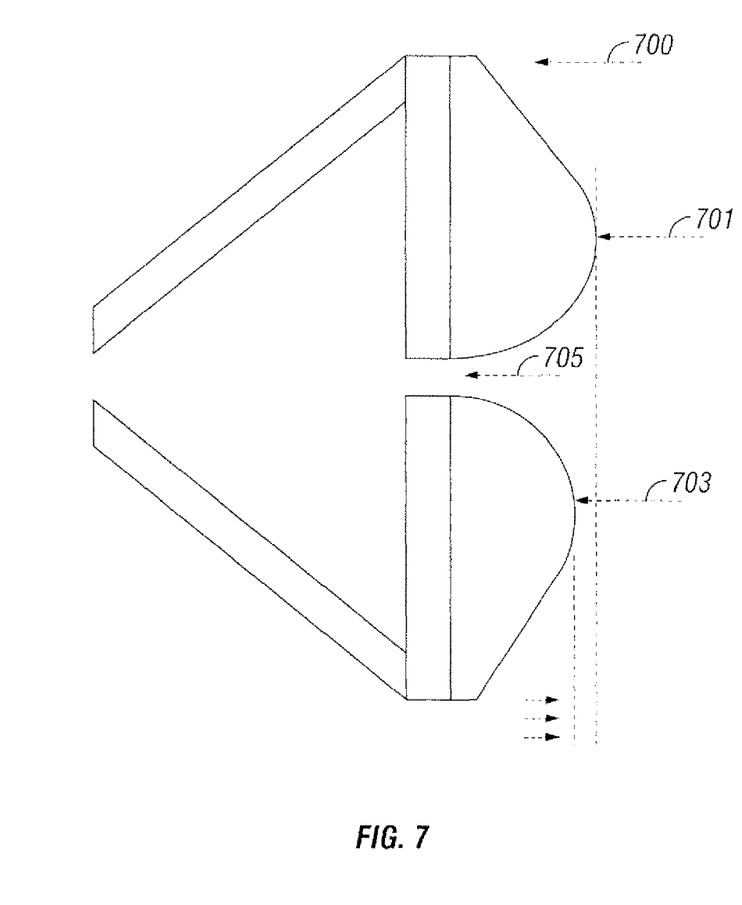
FIG. 7 is a sectional view of another embodiment of a suction bar of the device of in FIG. 1.

In an another embodiment, as illustrated in FIG. 7, another embodiment of the suction bar is generally referred to by the reference numeral 700, and contains the same parts of the suction bar 700 which are given the same reference numerals. The operation of this embodiment is similar to the operation of the previously described embodiment illustrated in FIG. 6, suction bar 600, where the trailing edge 701 and leading edge 703 are rounded. As in the previously described embodiment, each suction bar 700 is situated on the exterior of the disc-shaped filter 160 at a distance such that the trailing edge 701 of the suction bar 700 contacts the pile threads 311 of the filter medium 310 when the pile threads 311 are flattened. However the leading edge 703 of the suction bar 700 does not contact pile threads 311 in their flattened state. The currently described embodiment differs from the previously described embodiment illustrated in FIG. 7 in that more of the rounded surface area of the trailing edge contacts the pile threads 311. The leading edge 703 has a tapered leading edge and a rounded trailing edge, and the trailing edge 701 has a rounded leading edge and a tapered trailing edge.

Any spatial references such as, for example, "upper," "lower," "above," "below," "between," "vertical," "angular," "upward," "downward," "side-to-side," "left-to-right," "right-to-left," "top-to-bottom," "bottom-to-top," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

An apparatus for filtering liquid has been described that comprises a filter having an external surface, a rotatable shaft extending through the filter, and a movable member coupled to the rotatable shaft and configured to impart a suction force at various locations across the external surface of the filter, the movable member having a leading portion and a trailing portion relative to a direction of movement of the movable member across the filter, wherein the trailing portion extends further than the leading portion in a direction towards the filter.

In an exemplary embodiment, the filter comprises a plurality of filters each having an external surface, wherein the rotatable shaft extends through each of the filters, and wherein the movable member comprises a plurality of movable members each coupled to the rotatable shaft and configured to impact a suction force at various locations across a corresponding one of the filters.

In an exemplary embodiment, the filter surface is substantially disc-shaped.

In an exemplary embodiment, the filter is hollow.

In an exemplary embodiment, the filter is substantially drum-shaped.

In an exemplary embodiment, the filter comprises a filter medium supported by a frame, wherein the filter medium comprises the external surface of the filter.

In an exemplary embodiment, the apparatus further comprises a conduit fluidicly coupled to an internal volume of the filter.

In an exemplary embodiment, the apparatus further comprises a valve configured to selectively control fluid flow between the internal volume of the filter and the conduit.

In an exemplary embodiment, the apparatus further comprises the movable member is positioned relative to the filter such that the trailing portion contacts pile threads of the filter and the leading portion does not contact the pile threads when the pile threads are in a compacted state resulting from operation of the apparatus.

In an exemplary embodiment, the movable member comprises a suction opening defined between the leading and trailing portions and hydraulically coupled to a pump configured to generate the suction force at the suction opening.

In an exemplary embodiment, the suction opening has an elongated shape.

In an exemplary embodiment, the elongated shape of the suction opening is oriented at an angle relative to the external surface of the filter, wherein the angle is substantially less than 90°.

In an exemplary embodiment, the movable member is a first movable member, the apparatus further comprising a second movable member, wherein the first and second movable members are positioned on opposing sides of the filter.

In an exemplary embodiment, the apparatus further comprises a sensor configured to detect a pressure differential across the filter.

In an exemplary embodiment, the apparatus further comprises means for backwashing the filter in response to a predetermined pressure differential being detected by the sensor.

In an exemplary embodiment, the apparatus further comprises a control system configured to automatically initiate the backwashing means.

In an exemplary embodiment, the apparatus further comprises a filtration chamber configured to contain the filter and influent received from an influent source.

In an exemplary embodiment, the apparatus further comprises an influent trough configured to convey influent between the influent source and the filtration chamber.

In an exemplary embodiment, the apparatus further comprises an effluent trough configured to receive effluent from an internal volume of the filter via at least one conduit fluidicly coupling the effluent trough and the internal volume of the filter.

A method of cleaning a filter has also been described, the method comprising moving a member across an external surface of a filter, and imparting a suction force via the member at various locations across the filter while moving the member across the filter, wherein the movable member has a leading portion and a trailing portion relative to a direction of movement of the movable member across the external surface of the filter, wherein the trailing portion extends further than the leading portion in a direction towards the filter.

In an exemplary embodiment, moving the member across the external surface of the filter comprises contacting pile threads of the filter with the trailing portion of the movable member.

In an exemplary embodiment, moving the member across the external surface of the filter comprises not contacting the pile threads of the filter with the leading portion of the movable member when the pile threads are in a compacted state resulting from use of the filter.

In an exemplary embodiment, the method further comprises hydraulically coupling a pump to the movable member to provide the suction force via the member at the various locations across the filter while moving the member across the filter.

In an exemplary embodiment, the movable member is a first movable member and the external surface is a first external surface, and the method further comprises moving a second movable member across a second external surface of the filter, wherein the first and second external surfaces are on opposing sides of the filter, and wherein the first and second movable members are substantially similar.

In an exemplary embodiment, the method further comprises detecting a pressure differential across the filter.

In an exemplary embodiment, the method further comprises backwashing the filter in response to detection of a predetermined pressure differential across the filter.

An apparatus has also been described that comprises means for moving a member across an external surface of a filter, and means for imparting a suction force via the member at various locations across the filter while moving the member across the filter, wherein the movable member has a leading portion and a trailing portion relative to a direction of movement of the movable member across the external surface of the filter, wherein the trailing portion extends further than the leading portion in a direction towards the filter.

In an exemplary embodiment, the member moving means comprises means for contacting pile threads of the filter with the trailing portion of the movable member.

In an exemplary embodiment, the apparatus further comprises means for hydraulically coupling a pump to the movable member to provide the suction force via the member at the various locations across the filter while moving the member across the filter.

In an exemplary embodiment, the movable member is a first movable member and the external surface is a first external surface, and the method further comprises means for moving a second movable member across a second external surface of the filter, wherein the first and second external surfaces are on opposing sides of the filter, and wherein the first and second movable members are substantially similar.

In an exemplary embodiment, the apparatus further comprises means for detecting a pressure differential across the filter.

In an exemplary embodiment, further comprises means for backwashing the filter in response to detection of a predetermined pressure differential across the filter.

A method of manufacturing an apparatus for filtering liquid has also been described that comprises providing a filter having an external surface, providing a rotatable shaft extending through the filter, and coupling a movable member to the rotatable shaft such that the movable member is configured to impart a suction force at various locations across the external surface of the filter, the movable member having a leading portion and a trailing portion relative to a direction of movement of the movable member across the filter, wherein the trailing portion extends further than the leading portion in a direction towards the filter.

In an exemplary embodiment, the manufacturing method further comprises fluidicly coupling a conduit to an internal volume of the filter.

In an exemplary embodiment, the manufacturing method further comprises fluidicly coupling a valve between the conduit and the internal volume of the filter.

In an exemplary embodiment, the manufacturing method further comprises hydraulically coupling a pump to the movable member.

In an exemplary embodiment, the manufacturing method further comprises operably coupling a control system to the rotatable shaft and the pump, wherein the control system is configured to initiate and control a backwash cycle.

In an exemplary embodiment, the manufacturing method further comprises operably coupling a sensor to the control system, wherein the sensor is configured to detect a pressure differential across the filter, and wherein the control system is configured to initiate the backwash cycle in response to the detected pressure differential reaching a predetermined value.

A system for filtering liquid has also been described that comprises an influent source, a filtration chamber configured to receive influent from the influent source, a filter having an external surface and positioned within the filtration chamber, a rotatable shaft extending through the filter, a movable member coupled to the rotatable shaft and configured to impart a suction force at various locations across the external surface of the filter, the movable member having a leading portion and a trailing portion relative to a direction of movement of the movable member across the filter, wherein the trailing portion extends further than the leading portion in a direction towards the filter, a conduit fluidicly coupled to an internal volume of the filter, and an effluent return configured to receive effluent from the internal volume of the filter via the conduit.

In an exemplary embodiment, the influent source and the effluent return each comprise a portion of a municipal water treatment facility.

In an exemplary embodiment, the filter comprises a plurality of substantially similar filters.

In an exemplary embodiment, the movable member comprises a plurality of substantially similar movable members.

An apparatus has also been described that comprises a plurality of substantially disc-shaped hollow filters each having an external surface and each comprising a filter medium comprising a plurality of pile threads and supported by a frame, wherein the filter medium comprises the external surface of the filter; a plurality of conduits each fluidicly coupled to an internal volume of a corresponding one of the filters; a plurality of valves each configured to selectively control fluid flow between the internal volume of a corresponding one of the filters and a corresponding one of the conduits; a rotatable shaft extending through each of the filters; and a plurality of movable members each coupled to the shaft and configured to impart a suction force at various locations across a corresponding one of the filters, each of the movable members comprising a leading portion and a trailing portion relative to a direction of movement of the movable member across the corresponding filter, wherein the trailing portion extends further than the leading portion in a direction towards the corresponding filter; and a suction opening defined between the leading and trailing portions, wherein the suction opening has an elongated shape and is hydraulically coupled to a suction source configured to generate the suction force at the suction opening; wherein each movable member is positioned relative to the corresponding filter such that the trailing portion contacts pile threads of the filter and the leading portion does not contact the pile threads when the pile threads are in a compacted state resulting from operation of the apparatus; and wherein first ones of the plurality of movable members are positioned on a first side of the filters and second ones of the plurality of movable members are positioned on a second, opposing side of the filters; a sensor configured to detect a pressure differential across at least one of the filters; means for backwashing the filters in response to a predetermined differential being detected by the sensor; and a control system configured to automatically initiate the backwashing means.

In an exemplary embodiment, the suction source comprises a pump.

A method of cleaning a filter has also been described that comprises detecting a pressure differential across at least one of a plurality of substantially disc-shaped hollow filters, wherein the pressure differential is detected by a plurality of sensors; backwashing each filter in response to detection by the plurality of sensors of a predetermined pressure differential across at least one of the filters, wherein the backwashing is automatically initiated by a control system configured to receive a signal from the plurality of sensors indicating the detection of the predetermined pressure differential; and moving each of a plurality of first members across a first external surface and each of a plurality of second members across a second external surface of a corresponding one of the filters while imparting a suction force via the first and second members at various locations across the first and second external surfaces, respectively, wherein the first and second members are substantially similar, and wherein the first and second external surfaces are on opposing sides of each filter; wherein each of the first and second members has a leading portion and a trailing portion relative to a direction of movement of each member across the corresponding first and second external surface, respectively; wherein a suction opening is defined between the leading and trailing portions of each of the first and second members, wherein the suction opening has an elongated shape and is hydraulically coupled to a suction source configured to generate the suction force at the suction opening; and wherein the trailing portion of each of the first and second members contacts pile threads of each filter while the leading portion of each of the first and second members does not contact the pile threads when the pile threads are in a compacted state resulting from use of each filter.

An apparatus has also been described that comprises means for detecting a pressure differential across at least one of a plurality of substantially disc-shaped hollow filters; means for backwashing each filter in response to detection by the pressure differential detecting means of a predetermined pressure differential across at least one of the filters, wherein the backwashing means is automatically initiated by means for controlling the backwashing, and wherein the backwashing control means is configured to receive a signal from the pressure differential detecting means indicating the detection of the predetermined pressure differential; and means for moving each of a plurality of first members across a first external surface and each of a plurality of second members across a second external surface of a corresponding one of the filters while imparting a suction force via the first and second members at various locations across the first and second external surfaces, respectively, wherein the first and second members are substantially similar, and wherein the first and second external surfaces are on opposing sides of each filter; wherein each of the first and second members has a leading portion and a trailing portion relative to a direction of movement of each member across the corresponding first and second external surface, respectively; wherein a suction opening is defined between the leading and trailing portions of each of the first and second members, wherein the suction opening has an elongated shape and is hydraulically coupled to a suction source configured to generate the suction force at the suction opening; and wherein the trailing portion of each of the first and second members contacts pile threads of each filter while the leading portion of each of the first and second members does not contact the pile threads when the pile threads are in a compacted state resulting from use of each filter.

An apparatus has also been described that comprises means for guiding influent towards the surface of a plurality of substantially disc-shaped hollow filters; means for receiving effluent from the internal volume of each filter; means for detecting a pressure differential across at least one filter; means for moving a plurality of first members across a first external surface of each filter; means for moving a plurality of second members across a second external surface of each filter; means for imparting a suction force via each member at various locations across each filter while moving the first and second members across each filter; means for backwashing each filter in response to detection of a predetermined pressure differential across at least one of the filters; and means for hydraulically coupling a plurality of pumps to each of the first and second members to provide the suction force via the first and second members at the various locations across each filter while moving the first and second members across each filter; wherein the first and second external surfaces are on opposing sides of each filter, and wherein the first and second members are substantially similar; and wherein each of the first and second members has a leading portion and a trailing portion relative to a direction of movement of the member across the corresponding external surface of each filter, wherein the trailing portion of each member contacts pile threads of each filter while the leading portion does not contact the pile threads.

A method of manufacturing an apparatus for filtering liquid has also been described that comprises providing a plurality of substantially disc-shaped hollow filters each having an external surface and each comprising a filter medium comprising a plurality of pile threads and supported by a frame, wherein the filter medium comprises the external surface of the filter; providing a rotatable shaft extending through each of the filters; coupling a plurality of movable members each coupled to the shaft and configured to impart a suction force at various locations across a corresponding one of the filters, each of the movable members comprising a leading portion and a trailing portion relative to a direction of movement of the movable member across the corresponding filter, wherein the trailing portion extends further than the leading portion in a direction towards the corresponding filter; and a suction opening defined between the leading and trailing portions, wherein the suction opening has an elongated shape and is hydraulically coupled to a suction source configured to generate the suction force at the suction opening; wherein each movable member is positioned relative to the corresponding filter such that the trailing portion contacts pile threads of the filter and the leading portion does not contact the pile threads when the pile threads are in a compacted state resulting from operation of the apparatus; and wherein first ones of the plurality of movable members are positioned on a first side of the filters and second ones of the plurality of movable members are positioned on a second, opposing side of the filters fluidicly coupling a plurality of conduits to an internal volume of a corresponding one of the filter; fluidicly coupling a plurality of valves between a corresponding one of the conduits and the internal volume of a corresponding one of the filters; hydraulically coupling each movable member to at least one of a plurality of pumps; operably coupling a control system to the rotatable shaft and the pumps; and operably coupling a plurality of sensors to the control system; wherein the control system is configured to initiate and control a backwash cycle, and wherein the sensors are configured to detect a pressure differential across at least one of the filters, and wherein the control system is configured to initiate the backwash cycle in response to the detected pressure differential reaching a predetermined value.

A system for filtering liquid has also been described that comprises an influent source; a filtration chamber configured to receive influent from the influent source; a plurality of substantially disc-shaped hollow filters positioned within the filtration chamber, each having an external surface and each comprising a filter medium comprising a plurality of pile threads and supported by a frame, wherein the filter medium comprises the external surface of the filter; a plurality of conduits each fluidically coupled to an internal volume of a corresponding one of the filters; a plurality of valves each configured to selectively control fluid flow between the internal volume of a corresponding one of the filters and a corresponding one of the conduits; a rotatable shaft extending through each of the filters; and a plurality of movable members each coupled to the shaft and configured to impart a suction force at various locations across a corresponding one of the filters, each of the movable members comprising a leading portion and a trailing portion relative to a direction of movement of the movable member across the corresponding filter, wherein the trailing portion extends further than the leading portion in a direction towards the corresponding filter; and a suction opening defined between the leading and trailing portions, wherein the suction opening has an elongated shape and is hydraulically coupled to a suction source configured to generate the suction force at the suction opening; wherein each movable member is positioned relative to the corresponding filter such that the trailing portion contacts pile threads of the filter and the leading portion does not contact the pile threads when the pile threads are in a compacted state resulting from operation of the apparatus; and wherein first ones of the plurality of movable members are positioned on a first side of the filters and second ones of the plurality of movable members are positioned on a second, opposing side of the filters; a sensor configured to detect a pressure differential across at least one of the filters; means for backwashing the filters in response to a predetermined differential being detected by the sensor; a control system configured to automatically initiate the backwashing means; an effluent return configured to receive effluent from the internal volume of a corresponding one of the filters via a corresponding one of the conduits.

An apparatus for cleaning a filter has also been described that comprises a movable member configured to impart a suction force at various locations across an external surface of the filter, the movable member having a leading portion and a trailing portion relative to a direction of movement of the movable member across the filter, wherein the trailing portion extends further than the leading portion in a direction towards the filter.

In an exemplary embodiment, the suction opening is defined between the leading and trailing portions, wherein the suction opening has an elongated shape and is hydraulically coupled to a suction source configured to generate the suction force at the suction opening.

In an exemplary embodiment, the elongated shape is oriented at an angle relative to the external surface of the filter, wherein the angle is substantially less than 90°.

In an exemplary embodiment, the elongated shape is oriented at an angle relative to the external surface of the filter, wherein the angle is greater than or equal to 90°.

In an exemplary embodiment, the leading portion has a tapered leading edge and a rounded trailing edge, and wherein the trailing portion has a rounded leading edge and a tapered trailing edge.

In an exemplary embodiment, the leading portion has a substantially planar leading edge and a substantially hemispherical trailing edge, wherein the trailing portion has a substantially hemispherical leading edge and a substantially planar trailing edge, and wherein the substantially planar leading portion leading edge and the substantially planar trailing portion trailing edge are each substantially parallel to the external surface of the filter.

A method for cleaning a filter has also been described that comprises imparting a suction force via a movable member at various locations across the filter, wherein the movable member has a leading portion and a trailing portion relative to a direction of movement of the movable member across the filter; and the trailing portion extends further than the leading portion in a direction towards the filter.

An apparatus for cleaning a filter has also been described that comprises means for imparting a suction force via a movable member at various locations across the filter, wherein the movable member has a leading portion and a trailing portion relative to a direction of movement of the movable member across the filter; and the trailing portion extends further than the leading portion in a direction towards the filter.

A method of manufacturing an apparatus for cleaning a filter has also been described that comprises providing a body; providing an interface configured to couple the body to a rotatable shaft, the interface having an aperture therethrough for receiving the shaft; coupling a leading portion extending from the body relative to a direction of movement of the movable member across the filter; and coupling a trailing portion extending from the body relative to a direction of movement of the movable member across the filter, wherein the trailing portion extends further than the leading portion in a direction towards the filter.

A system for cleaning a filter has also been described that comprises a filter having an external surface; a movable member configured to impart a suction force at various locations across the external surface of the filter, the movable member having a leading portion and a trailing portion relative to a direction of movement of the movable member across the filter, wherein the trailing portion extends further than the leading portion in a direction towards the filter.

An apparatus for cleaning a filter has also been described that comprises a movable member configured to impart a suction force at various locations across the filter, the movable member comprising a leading portion and a trailing portion relative to a direction of movement of the movable member across the filter, wherein the trailing portion extends further than the leading portion in a direction towards the filter; and a suction opening defined between the leading and trailing portions, wherein the suction opening has an elongated shape and is hydraulically coupled to a pump configured to generate the suction force at the suction opening; and wherein the movable member is positioned relative to the filter such that the trailing portion contacts pile threads of the filter and the leading portion does not contact the pile threads when the pile threads are in a compacted state resulting from operation of the apparatus.

Although several exemplary embodiments have been described in detail above, those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus for filtering liquid, comprising:
   a filter having an external surface and an internal surface, at least a portion of the internal surface facing another portion of the internal surface;
   a rotatable shaft extending through the filter; and
   a movable member coupled to the rotatable shaft and configured to impart a suction force at various locations across the external surface of the filter, the movable member having a leading portion and a trailing portion relative to a direction of movement of the movable member across the filter,
   wherein the movable member is positioned relative to the filter such that the trailing portion contacts pile threads of the filter and the leading portion does not contact the pile threads when the pile threads are in a compacted state resulting from operation of the apparatus.

2. The apparatus of claim 1 wherein the filter comprises a plurality of filters each having an external surface, wherein the rotatable shaft extends through each of the filters, and wherein the movable member comprises a plurality of movable members each coupled to the rotatable shaft and configured to impact a suction force at various locations across a corresponding one of the filters.

3. The apparatus of claim 1 wherein the filter is substantially disc-shaped.

4. The apparatus of claim 1 wherein the filter is hollow.

5. The apparatus of claim 4 wherein the filter is substantially drum-shaped.

6. The apparatus of claim 1 wherein the filter comprises a filter medium supported by a frame, wherein the filter medium comprises the external surface of the filter.

7. The apparatus of claim 1 further comprising a conduit fluidically coupled to an internal volume of the filter.

8. The apparatus of claim 7 further comprising a valve configured to selectively control fluid flow between the internal volume of the filter and the conduit.

9. The apparatus of claim 1 wherein the movable member comprises a suction opening defined between the leading and trailing portions and hydraulically coupled to a pump configured to generate the suction force at the suction opening.

10. The apparatus of claim 9 wherein the suction opening has an elongated shape.

11. The apparatus of claim 10 wherein the elongated shape is oriented at an angle relative to the external surface of the filter, wherein the angle is substantially less than 90 degrees.

12. The apparatus of claim 1 wherein the movable member is a first movable member, the apparatus further comprising a second movable member, wherein the first and second movable members are positioned on opposing sides of the filter.

13. The apparatus of claim 1 further comprising a sensor configured to detect a pressure differential across the filter.

14. The apparatus of claim 13 further comprising means for backwashing the filter in response to a predetermined pressure differential being detected by the sensor.

15. An apparatus, comprising:
   means for guiding influent towards the surface of a plurality of substantially disc-shaped hollow filters, each filter having at least one internal surface, a first external surface, and a second external surface, at least a portion of the internal surface facing another portion of the internal surface, the first and second external surfaces facing opposite directions from one another;
   means for receiving effluent from the internal volume of each filter;
   means for detecting a pressure differential across at least one filter;
   means for moving a plurality of first members across the first external surface of each filter;
   means for moving a plurality of second members across the second external surface of each filter;
   means for imparting a suction force via each member at various locations across each filter while moving the first and second members across each filter;
   means for backwashing each filter in response to detection of a predetermined pressure differential across at least one of the filters; and
   means for hydraulically coupling a plurality of pumps to each of the first and second members to provide the suction force via the first and second members at the various locations across each filter while moving the first and second members across each filter;
   wherein the first and second external surfaces are on opposing sides of each filter, and wherein the first and second members are substantially similar; and
   wherein each of the first and second members has a leading portion and a trailing portion relative to a direction of movement of the member across the corresponding external surface of each filter, wherein the trailing portion of each member contacts pile threads of each filter while the leading portion does not contact the pile threads.

16. A system for filtering liquid, comprising:
an influent source;
a filtration chamber configured to receive influent from the influent source;
a plurality of substantially disc-shaped hollow filters positioned within the filtration chamber, each having an external surface and an internal surface, at least a portion of the internal surface facing another portion of the internal surface, and each filter comprising a filter medium comprising a plurality of pile threads and supported by a frame, wherein the filter medium comprises the external surface of the filter;
a plurality of conduits each fluidicly coupled to an internal volume of a corresponding one of the filters;
a plurality of valves each configured to selectively control fluid flow between the internal volume of a corresponding one of the filters and a corresponding one of the conduits;
a rotatable shaft extending through each of the filters; and
a plurality of movable members each coupled to the shaft and configured to impart a suction force at various locations across the external surface of a corresponding one of the filters, each of the movable members comprising:
a leading portion and a trailing portion relative to a direction of movement of the movable member across the corresponding filter, wherein the trailing portion extends further than the leading portion in a direction towards the corresponding filter; and
a suction opening defined between the leading and trailing portions, wherein the suction opening has an elongated shape and is hydraulically coupled to a suction source configured to generate the suction force at the suction opening;
wherein each movable member is positioned relative to the corresponding filter such that the trailing portion contacts pile threads of the filter and the leading portion does not contact the pile threads when the pile threads are in a compacted state resulting from operation of the apparatus; and
wherein first ones of the plurality of movable members are positioned on a first side of the filters and second ones of the plurality of movable members are positioned on a second, opposing side of the filters;
a sensor configured to detect a pressure differential across at least one of the filters;
means for backwashing the filters in response to a predetermined differential being detected by the sensor;
a control system configured to automatically initiate the backwashing means; and
an effluent return configured to receive effluent from the internal volume of a corresponding one of the filters via a corresponding one of the conduits.

\* \* \* \* \*